United States Patent

McClelland et al.

(10) Patent No.: US 9,754,268 B2
(45) Date of Patent: Sep. 5, 2017

(54) PERSONA ENGINE

(75) Inventors: Steven Andrew McClelland, San Francisco, CA (US); Michael Metcalf, San Francisco, CA (US); Fernando Padilla, San Francisco, CA (US); Sarah Jean Sosiak, San Francisco, CA (US)

(73) Assignee: Yahoo Holdings, Inc., Sunnyvale, CA (US)

( * ) Notice: Subject to any disclaimer, the term of this patent is extended or adjusted under 35 U.S.C. 154(b) by 318 days.

(21) Appl. No.: 13/315,028

(22) Filed: Dec. 8, 2011

(65) Prior Publication Data

US 2013/0151602 A1 Jun. 13, 2013

(51) Int. Cl.
*G06F 15/16* (2006.01)
*G06Q 30/02* (2012.01)

(52) U.S. Cl.
CPC ............................ *G06Q 30/02* (2013.01)

(58) Field of Classification Search
CPC .............. G06F 17/30766; G06F 15/16; G06Q 30/0256
USPC ...... 709/200, 204, 217, 219; 705/14, 26, 27; 725/46, 47
See application file for complete search history.

(56) References Cited

U.S. PATENT DOCUMENTS

| | | | | |
|---|---|---|---|---|
| 6,671,682 B1 * | 12/2003 | Nolte | ................ | G06F 17/30867 |
| 7,631,032 B1 * | 12/2009 | Refuah | ............... | G06F 17/3087 709/201 |
| 7,735,013 B2 | 6/2010 | Shaouy et al. | | |
| 8,402,163 B2 * | 3/2013 | Almeida | ........... | G06F 17/30867 709/217 |
| 8,751,305 B2 * | 6/2014 | Manoogian, III | . | G06Q 30/0269 705/14.49 |
| 8,997,089 B2 * | 3/2015 | Brannen, Jr. | ............. | G06F 8/61 717/174 |
| 9,026,516 B1 * | 5/2015 | Chapin | ............... | G06F 17/3005 707/706 |
| 2002/0005784 A1 * | 1/2002 | Balkin | ..................... | A61B 5/16 340/573.1 |
| 2003/0005077 A1 * | 1/2003 | Krishnan | .......... | G06F 17/30902 709/217 |
| 2006/0020593 A1 * | 1/2006 | Ramsaier | .......... | G06F 17/30867 |
| 2006/0074883 A1 * | 4/2006 | Teevan | .............. | G06F 17/30867 |
| 2006/0170945 A1 * | 8/2006 | Bill | .................... | G06F 17/30749 358/1.13 |
| 2006/0212900 A1 * | 9/2006 | Ismail | .................... | H04H 60/06 725/34 |

(Continued)

FOREIGN PATENT DOCUMENTS

TW 200828941 7/2008

OTHER PUBLICATIONS

Eisenberg, Bryan; Making Personas Sparkle Like Diamonds, Part I, www.clickz.com Jan. 21, 2005 (4 pages).

(Continued)

*Primary Examiner* — Anthony Mejia
(74) *Attorney, Agent, or Firm* — Weaver Austin Villeneuve & Sampson LLP (57) ABSTRACT

In one embodiment at least one user profile of a user may be obtained. Information may be provided to the user by one or more personalization engines based, at least in part, upon the at least one user profile. Each of the one or more personalization engines may be configured to operate according to a different one of a plurality of personas.

27 Claims, 6 Drawing Sheets

(56) References Cited

U.S. PATENT DOCUMENTS

| | | | |
|---|---|---|---|
| 2007/0015520 A1* | 1/2007 | Casey | G01C 21/20 455/456.3 |
| 2007/0089125 A1* | 4/2007 | Claassen | H04H 60/33 725/9 |
| 2007/0124701 A1* | 5/2007 | Gong | G06F 17/30873 715/854 |
| 2007/0130132 A1* | 6/2007 | Wu | G06F 17/30964 |
| 2007/0179792 A1* | 8/2007 | Kramer | G06Q 30/02 705/1.1 |
| 2007/0204301 A1* | 8/2007 | Benson | G06Q 30/00 725/46 |
| 2007/0239522 A1* | 10/2007 | Kunz | G06Q 30/02 705/14.66 |
| 2008/0033826 A1* | 2/2008 | Maislos | G06Q 30/00 705/14.66 |
| 2008/0040354 A1* | 2/2008 | Ray | G06F 17/30035 |
| 2008/0071929 A1* | 3/2008 | Motte | G06F 17/3089 709/246 |
| 2009/0002178 A1* | 1/2009 | Guday | A61B 5/0002 340/573.1 |
| 2009/0164452 A1* | 6/2009 | Yogaratnam | G06F 17/30867 |
| 2009/0276459 A1* | 11/2009 | Trout | G06Q 10/10 |
| 2009/0281997 A1* | 11/2009 | Jain | G06F 17/30864 |
| 2009/0282343 A1* | 11/2009 | Catlin | G06F 17/30867 715/738 |
| 2010/0049702 A1* | 2/2010 | Martinez | H04L 12/58 707/769 |
| 2010/0075289 A1* | 3/2010 | Maher | G09B 7/00 434/323 |
| 2010/0100398 A1* | 4/2010 | Auker | G06Q 10/087 705/4 |
| 2010/0106628 A1* | 4/2010 | Ross | G06Q 30/0201 705/30 |
| 2010/0161382 A1* | 6/2010 | Cole | G06F 17/30867 705/7.32 |
| 2010/0205129 A1* | 8/2010 | Aaron | G06Q 30/02 706/14 |
| 2010/0281427 A1* | 11/2010 | Ghosh | G06F 21/6263 715/811 |
| 2011/0071893 A1* | 3/2011 | Malhotra | G06Q 10/109 705/14.23 |
| 2011/0081921 A1* | 4/2011 | Casey | G01C 21/20 455/456.3 |
| 2011/0093780 A1* | 4/2011 | Dunn | G06Q 30/0269 715/706 |
| 2011/0153377 A1* | 6/2011 | Novikov | G06Q 10/063 705/7.11 |
| 2011/0153412 A1* | 6/2011 | Novikov | G06Q 30/02 705/14.42 |
| 2011/0179116 A1* | 7/2011 | Solomon | G06Q 30/02 709/204 |
| 2011/0252297 A1* | 10/2011 | Cotter | G06F 17/30867 715/205 |
| 2011/0264528 A1* | 10/2011 | Whale | G06Q 30/02 705/14.58 |
| 2011/0270709 A1* | 11/2011 | Lewis | G06Q 30/02 705/27.1 |
| 2011/0289190 A1* | 11/2011 | Chamberlain | G06Q 30/0201 709/217 |
| 2012/0054022 A1* | 3/2012 | Kosashvili | G06F 17/30 705/14.43 |
| 2012/0092167 A1* | 4/2012 | Hohl | G06F 3/017 340/573.1 |
| 2012/0123867 A1* | 5/2012 | Hannan | G06Q 30/0261 705/14.58 |
| 2012/0290399 A1* | 11/2012 | England | G06Q 30/0282 705/14.66 |
| 2013/0019202 A1* | 1/2013 | Regan | G06F 17/30867 715/810 |
| 2013/0024910 A1* | 1/2013 | Verma | H04L 63/08 726/3 |
| 2013/0031470 A1* | 1/2013 | Daly, Jr. | G06F 17/30893 715/243 |
| 2013/0041750 A1* | 2/2013 | Ye | G06Q 30/02 705/14.52 |
| 2013/0054366 A1* | 2/2013 | Roundtree | G06Q 30/0269 705/14.55 |
| 2013/0085859 A1* | 4/2013 | Sim | G06Q 30/02 705/14.58 |
| 2013/0086167 A1* | 4/2013 | Blom | G06Q 50/01 709/204 |
| 2013/0089841 A1* | 4/2013 | Paul | G09B 7/02 434/236 |
| 2013/0238727 A1* | 9/2013 | Martinez | H04L 12/58 709/206 |

OTHER PUBLICATIONS

WO patent application No. PCT/US2012/045134, International Search Report and Written Opinion mailed Dec. 10, 2012.

TW patent application No. 101125326, Office Action mailed Dec. 8, 2014.

TW patent application No. 101125326, Office Action mailed Apr. 27, 2015.

TW patent application No. 101125326, Examination Opinion mailed Aug. 26, 2016.

* cited by examiner

PERSONA ENGINE

BACKGROUND OF THE INVENTION

The disclosed embodiments relate generally to methods and apparatus for providing information to users by personalization engines implementing different personas.

Traditionally, each individual who visits a website obtains the same information. In slightly more advanced systems, sections of content provided via the website may be password protected to limit access to the information. However, these types of systems typically involve significant oversight and maintenance.

Information may also be transmitted to individuals via devices such as computers and mobile devices. In fact, personalized content delivery has become a popular means for providing information to interested users. Personalized content delivery is often performed at the request of an individual user based upon preferences of the user.

SUMMARY OF THE INVENTION

The disclosed embodiments support the personalization of information by a personalization engine implementing one or more personas. In accordance with one embodiment, a user profile of a user may be obtained. Information may be provided to the user by one or more personalization engines based, at least in part, upon the user profile, wherein each of the one or more personalization engines may be configured to operate according to a different one of a plurality of personas.

In accordance with another embodiment, input may be obtained from a user. Information may be provided to the user by one or more of two or more personalization engines based, at least in part, upon the input from the user, wherein each of the two or more personalization engines is configured to operate according to a different one of two or more personas.

In accordance with yet another embodiment, input may be obtained from a user. Information may be provided to the user by a personalization engine based, at least in part, upon the input from the user. The personalization engine may be configurable to operate according to one or more of two or more personas. The input of the user may indicate the one or more of two or more personas that are to be implemented by the personalization engine.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The disclosed embodiments enable information to be provided to a user by one or more personas via one or more personalization engines. Each of the personas (or corresponding personalization engine(s)) may be optimized to achieve a different goal, operate according to a different interest, or operate according to a different mood. In this manner, information that is provided to the user may be presented according to various goal(s), interest(s), or point(s) of view (e.g., bias(es), tone(s), voice(s), and/or mood(s)) of the persona(s) employed.

The information that is provided may include advertisements, reminders, notifications, advice, or other content. Examples of content items include or pertain to media such as audio content (e.g., songs or playlists), video content (e.g., movies), image content (e.g., photographs or digitally created images), text content, and/or content that has traditionally been provided via a paper medium (e.g., newspapers, magazines, books, articles, etc.).

Figure 1A:
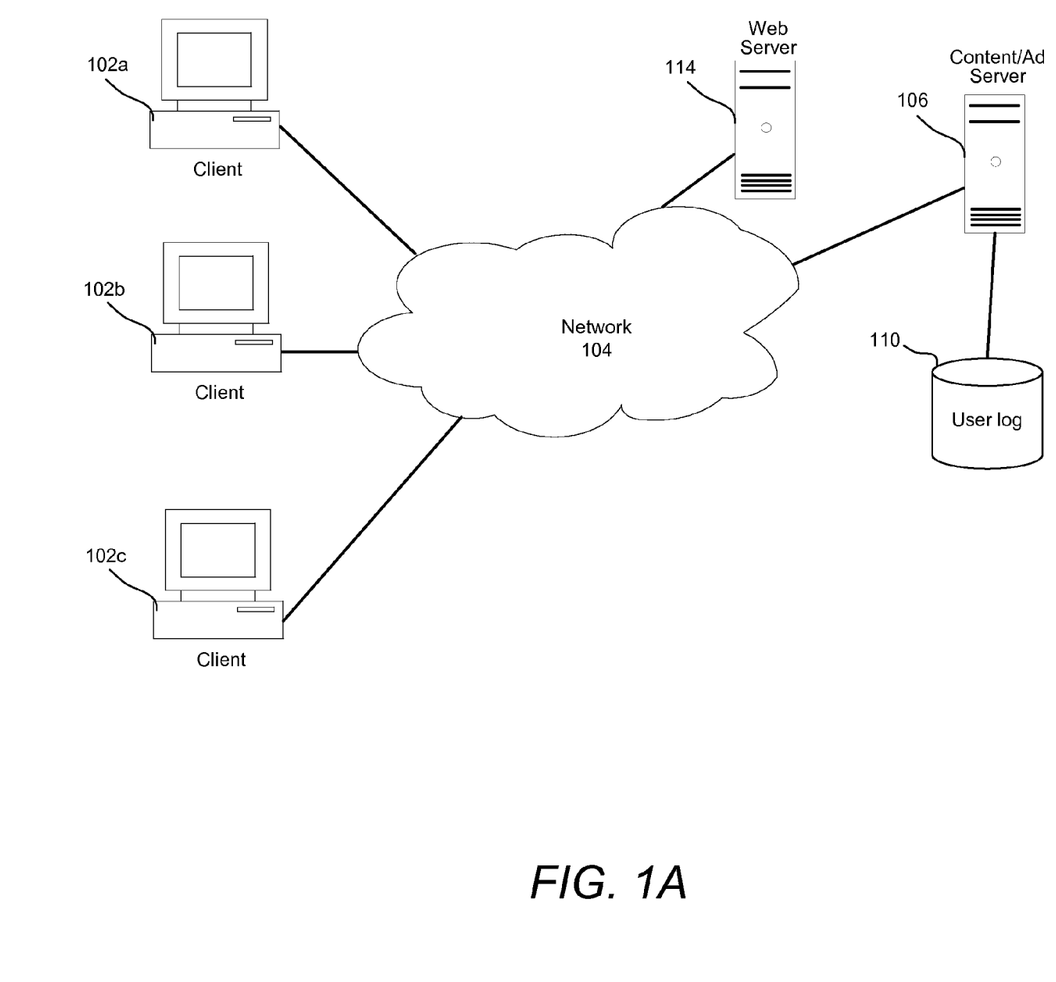
FIG. 1A is a diagram illustrating an example system in which embodiments of the invention may be implemented.

FIG. 1A illustrates an example network segment in which various embodiments of the invention may be implemented. As shown, a plurality of clients 102a, 102b, 102c may each receive an impression (i.e., view) of one or more advertisements upon accessing a web page via a web server 114. Alternatively, an advertisement may be transmitted to the clients 102a, 102b, 102c by one or more content/ad server(s) 106 via the web server, electronic mail, text message, or digital television. Advertisements may be transmitted via the content/ad server 106, which may be coupled to the web server 114, as shown. However, it is important to note that the disclosed embodiments may be implemented via any number of servers.

Similarly, clients 102a, 102b, 102c may access information such as one or more content items upon accessing a web page via the web server 114. More particularly, the information may be transmitted via the content/ad server 106. The content/ad server(s) 106 may also transmit the information via electronic mail, text message, or digital television. The clients 102a, 102b, 102c may be coupled to the web server 114 via a network 104. The network 104 may take any suitable form, such as a wide area network or Internet and/or one or more local area networks (LAN's). The network 104 may include any suitable number and type of devices, e.g., routers and switches, for forwarding data and/or search or web object requests from each client to the search or web application and search or web results back to the requesting clients.

The web server 114 may provide services associated with a social network. Example social networks include, but are not limited to, Yahoo, Facebook, Twitter, and Linked In. The services provided by the social network may include matchmaking services, social or business networking services, messaging services, and/or the ability to share content such as photos or videos.

The content/ad server 106 (or servers) of the online publisher may have access to one or more user logs 110 (e.g., user databases) into which user information is retained. This user information or a portion thereof may be referred to as a user profile. More particularly, the user profile may include public information that is available in a public profile and/or private information. The user logs 110 may be retained in one or more memories that are coupled to the content/ad server 106.

The user information retained in the user logs 110 may include personal information such as demographic information (e.g., age and/or gender) and/or geographic information (e.g., residence address, work address, and/or zip code). In addition, each time a user performs online activities such as clicking on an advertisement or purchasing goods or services, information regarding such activity or activities may be retained as user data in the user logs 110. For instance, the user data that is retained in the user logs 110 may indicate the identity of web sites visited, identity of ads that have been selected (e.g., clicked on) and/or a timestamp. Moreover, where the online publisher supports a search engine (e.g., via the content/ad server 106 or a separate search server), information associated with a search query, such as search term(s) of the search query, information indicating characteristics of search results that have been selected (e.g., clicked on) by the user, and/or associated timestamp may also be retained in the user logs 110. A user may be identified in the user logs 110 by a user ID (e.g., user account ID), information in a user cookie, etc.

In accordance with various embodiments, the content/ad server(s) 106 may maintain a plurality of advertisements. Similarly, the content/ad server(s) 106 may maintain or have access to information such as a plurality of content items. The content/ad server(s) 106 may select and serve advertisements and/or content items to users by personalization engines implementing various personas.

Each of a plurality of personalization engines may be optimized to achieve a different one of a plurality of goals or operate according to a different one of a plurality of points of view or interests. More particularly, each of the personalization engines may operate according to a different algorithm or different search engine. Furthermore, each of the personalization engines may perform an algorithm or access a search engine by applying one or more parameters (e.g., as indicated by a user's input). In this manner, each personalization engine may implement a corresponding persona.

Embodiments disclosed herein for selecting an advertisement or content item to deliver to a user may be implemented via the content/ad server 106. Furthermore, embodiments for charging advertisers (or content distributors) based, at least in part, upon the characteristics of users and/or persona(s) of users receiving the advertisements or other information may also be implemented via the content/ad server 106.

Figure 1B:
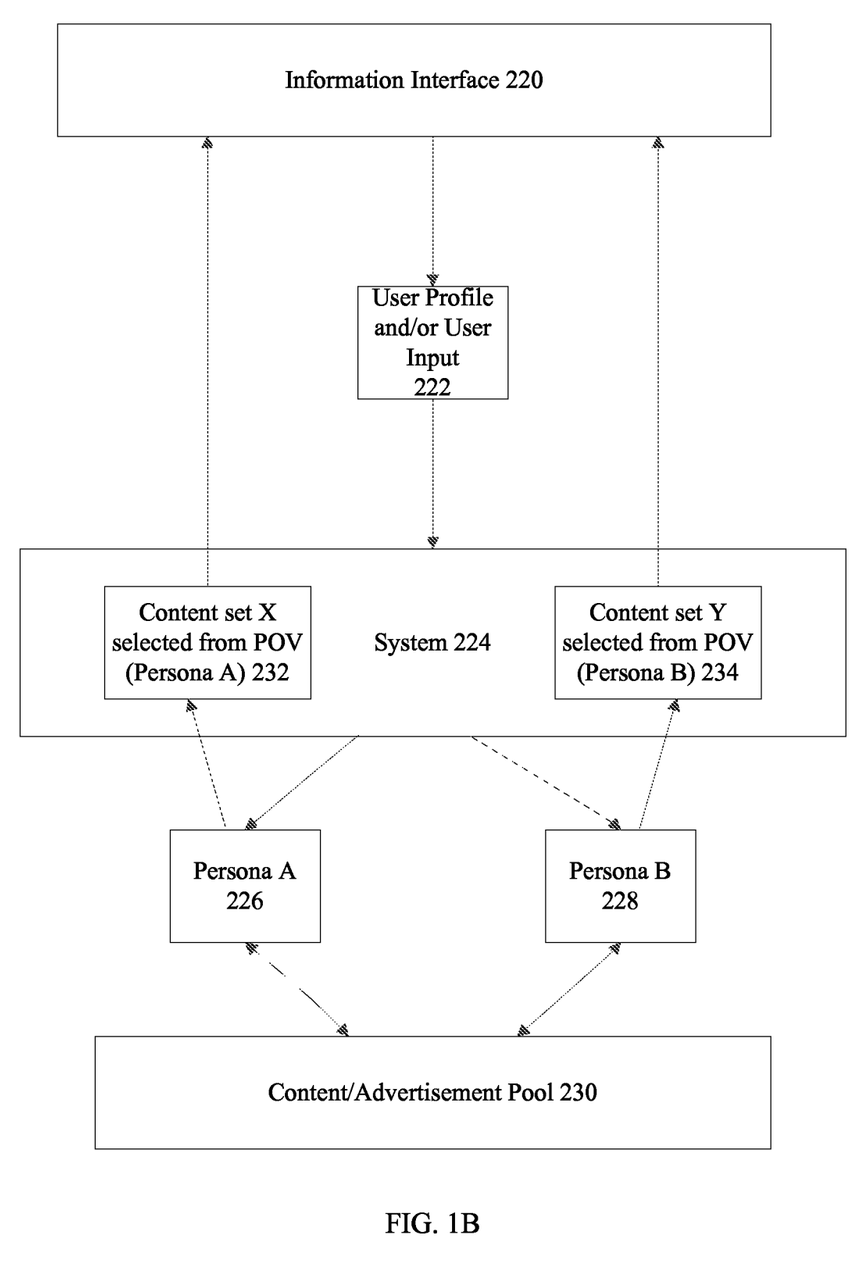
FIG. 1B is a block diagram illustrating an example information flow in a system in which two different personas are active in accordance with various embodiments.

FIG. 1B is a block diagram illustrating an example information flow in a system in which one or more different personas are active in accordance with various embodiments. As shown in FIG. 1B, user input may be submitted via an Information Interface 220. For example, the user input may include a selection of one or more personas, a search query, and/or a question. The user input and/or a user profile 222 may be provided to or otherwise accessed by System 224. In this example, two different personas, Persona A 226 and Persona B 228, are implemented via System 224. However, it is important to note that any number of personas may be implemented as a result of system configuration and/or user input.

Each of the personas may access information such as content items or advertisements via Pool 230 and/or other sources such as the Internet. Each of the personas may return a particular content set (e.g., content and/or advertisement(s)) based upon the point of view (POV) of that persona. In this example, Persona A 226 returns content set X selected from the POV of Persona A, which is provided by the System 224 to the Information Interface 220, as shown at 232. Similarly, Persona B returns content set Y selected from the POV of Persona B, which is provided by the System 224 to the Information Interface, as shown at 234. Moreover, the Information Interface may indicate which Persona(s) are active (e.g., via color and/or other indicator(s)).

The disclosed embodiments may be implemented via software and/or hardware. More particularly, the disclosed embodiments may be implemented, at least in part, by software and/or hardware coupled to a web server such as a content/ad server. Furthermore, the disclosed embodiments may be implemented, at least in part, by software and/or hardware implemented at a client such as a computer or mobile device.

An online publisher (i.e., web publisher) will generally be responsible for delivering multiple advertisements (or content) via the Internet (or other communication media such as email, text message, or digital television). A contract agreement associated with a particular advertisement may specify a minimum number of page views (i.e., impressions) to be delivered within a particular period of time. The web publisher is therefore responsible for providing the requested number of impressions for each advertisement.

An advertisement may include content pertaining to a product or service, which may be delivered via the Internet, email, text message, or digital television. The content typically includes text. However, it is important to note that an advertisement may include text, one or more images, video, and/or audio. In some embodiments, an advertisement may include a coupon, which may be redeemed by a user. An advertisement may also include one or more hypertext links, enabling a user to proceed with the purchase of a particular product or service.

The disclosed embodiments support the dynamic selection and transmission of advertisements or content to users by one or more personalization engines. Advertisements and/or content items may be provided to users via a variety of communication media including, but not limited to, a web site (e.g., via display on a web page of the web site), electronic mail, Short Message Service (SMS), a mobile device, or another medium such as digital television, which may be connected to the Internet. For instance, selected advertisement(s) may be provided to a user via the Internet.

Specifically, when a user visits a web page via the Internet, the system (e.g., ad server 106) may automatically select an advertisement (or a content item) to be served to the user. The publisher may then automatically provide the selected advertisement(s) or content item(s) to the user (e.g., by placing the advertisement or content item in the web page).

When an advertisement or a content item is provided to a particular user, information pertaining to the advertisement (e.g., identifying a product or service advertised in the advertisement) or information pertaining to the content item may be stored in association with the user's account data. In addition, the server(s) 106 may automatically collect online (and/or real world) behavioral data for any of users 102a, 102b, 102c to determine whether an advertisement was successful. In other words, the server(s) 106 may determine whether the user purchased the product or service advertised in the advertisement. Data indicating whether the advertisement was successful may also be stored in association with the user's account data and/or the advertisement.

Figure 2A:
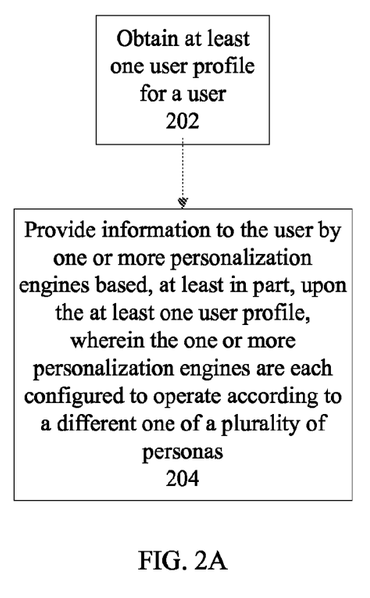
FIGS. 2A-C are process flow diagrams illustrating example methods of serving information to users by personalization engines implementing different personas in accordance with various embodiments.
Figure 2B:
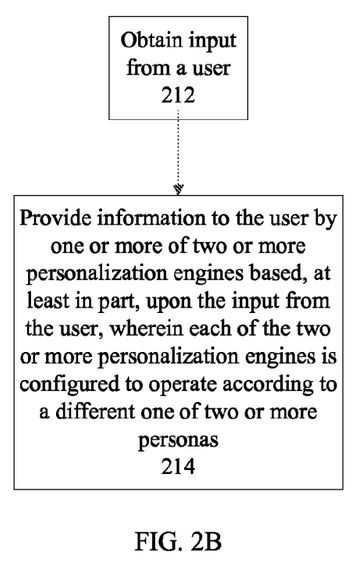
Figure 2C:
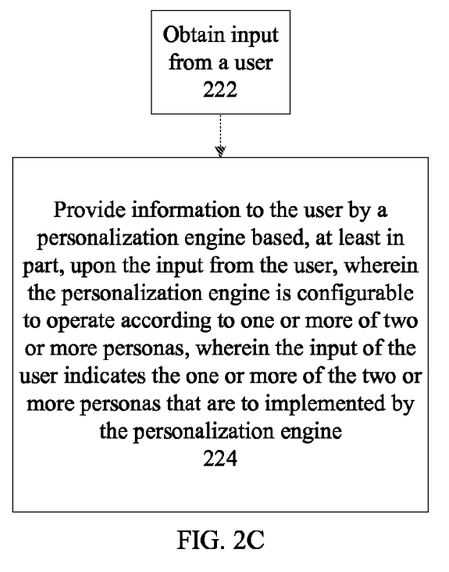

FIGS. 2A-C are process flow diagrams illustrating example methods of serving information to users by personalization engines implementing different personas in accordance with various embodiments. Personalization of information may be performed based, at least in part, upon a user's profile. As shown in FIG. 2A, at least one profile of a user may be obtained at 202. More particularly, the user profile(s) may be obtained from memory. Information may be provided to the user by one or more personalization engines based, at least in part, upon the at least one user profile at 204. More particularly, each of the personalization engines may be configured to operate according to a different one of a plurality of personas.

The system may automatically ascertain a context of the user and select the personalization engine(s) or corresponding persona(s) that are to provide the information based, at least in part, upon the context of the user. The context may indicate a device that the user is operating and/or a location of the user. For example, the context may include an Internet Protocol (IP) address of the device that the user is operating, a Global Positioning System (GPS) location of the user as obtained via the device, and/or time of day. Thus, each device may operate according to a different set of one or more personas. For example, where the user is determined to be home, the system may select the "Television Show" persona in order to recommend television shows to the user. Alternatively, where the user is determined to be away from home, the system may select the "Restaurant" persona in order to recommend restaurants to the user. The restaurants that are recommended may depend, for example, on the location of the user and/or the time of day.

Other example personas may include personas such as "Skeptic," "Cheap skate," "High-Roller," "Know-it-all," "Competitor," "Connector," "Bubbly", "Pushy", "Creative, and "Lazy." More particularly, the "Skeptic" persona may operate from a point of view of an individual who is skeptical of information provided to them. As a result, the "Skeptic" persona may provide a factual basis for any information or recommendations that are presented. The "Cheap skate" persona may provide information/recommendations that minimize cost to the user. In contrast, the "High-Roller" persona may suggest more upscale locations or venues that are popular among celebrities. The "Know-it-all" persona may provide information/recommendations that are less well-known and therefore unlikely to be known by a person who "knows it all." Information/recommendations provided by a "Competitor" persona may keep in mind that the person receiving the information/recommendations enjoys competing with others. As a result, the "Competitor" persona might recommend watching and/or participating in competitive sports in the user's area. The "Lazy" persona might only recommend activities near the user, where the user can sit the entire time. The "Connector" persona may prioritize connections (e.g., physical, emotional, and/or electronic) with others when providing information/recommendations.

In accordance with various embodiments, the user may select one or more of the plurality of personas from which the user wishes to receive information. Thus, the system may receive input from the user, where the input indicates a selection of at least one of the plurality of personas. Where the user submits input indicating a selection of two or more personas from which information is desired, the user may indicate an allocation or prioritization of the two or more personas from which information is desired. The personalization engine(s) operating according to the selected persona(s) may therefore provide the information to the user based, at least in part, upon the input and/or user profile.

Information may be provided to the user by two or more personalization engines. In accordance with one embodiment, a first one of the two or more personalization engines may provide a first set of information to the user during a first time period (e.g., at a first time), while a second one of the two or more personalization engines may provide a second set of information during a second time period (e.g., at a second time that is different from the first time). In accordance with another embodiment, two or more personalization engines may each provide a corresponding, separate set of information via a single graphical user interface (e.g., at the same time or during the same time period). In accordance with yet another embodiment, a first one of the two or more personalization engines may generate a first set of information and a second one of the two or more personalization engines may generate a second set of information. The system may obtain the first set of information and the second set of information, and generate a third set of information from the first set of information and the second set of information. The third set of information may be presented via a graphical user interface.

Where input is received indicating an allocation or prioritization of two or more personas (or personalization engines) from which information is desired, the system may generate and provide information by one or more personalization engines according to the allocation or prioritization. More particularly, the system may implement a model that operates by applying the two or more personas as specified by the allocation or prioritization. For example, the user may request information about food and fitness, and indicate that the information provided should be allocated 75% food and 25% fitness. Therefore, 25% of the information that is provided may pertain to fitness, while 75% of the information that is provided may pertain to food. As another example, the user may request information pertaining to food and health, and indicate that information pertaining to health should be prioritized over the information pertaining to food. The system may therefore identify information that pertains to both food and health (e.g., healthy recipes), but pertains more to health than food. In other words, since health is prioritized over food, the system may be more likely to provide recipes for health food or identify health food restaurants, rather than provide recipes for desserts or identify the top restaurants.

The input received from the user may associate a device with one or more personas (or corresponding personalization engines). Furthermore, the user may associate each one of two or more devices with a corresponding one of two or more personalization engines (or personas).

The input received from the user may also include a question (e.g., topic) to which the user wishes to receive an answer or further information. Thus, the information that is returned to the user may include at least one answer to the question or information pertaining to the specified topic. More particularly, answer(s) to a user specified question (or information pertaining to a specified topic) may be provided by one or more personalization engines (or personas).

As shown in FIG. 2B, input may be obtained from a user at 212. Examples of user input that may be received are described above with reference to FIG. 2A. Information may be provided to the user by one or more of two or more personalization engines based, at least in part, upon the input received from the user at 214, wherein each of the two or more personalization engines is configured to operate according to a different one of two or more personas. As described above, the information may be provided based, at least in part, upon a profile of the user, as well as the input received from the user.

Each personalization engine may be configurable. As shown in FIG. 2C, input may be obtained from a user at 222. The personalization engine may provide information to the user based, at least in part, upon the input received from the user at 224. As described above, the information may be provided based, at least in part, upon a profile of the user, as well as the input received from the user. In accordance with various embodiments, the personalization engine may be configurable to operate according to one or more of two or more personas. More particularly, the input of the user may indicate the one or more of the two or more personas that are to be implemented by the personalization engine.

In one embodiment, the personalization engine may be configurable to operate according to an allocation or prioritization of one or more of two or more personas. More particularly, the input of the user may indicate the allocation (i.e., distribution) and/or prioritization of the one or more personas that are to be implemented by the personalization engine.

An allocation may indicate or otherwise specify a distribution of information requested among the one or more personas. In one embodiment, the user may indicate or specify a percentage between 0 and 100 for each of the one or more personas such that the total percentage totals 100. This allocation may be obtained, for example, via a graphical element displayed in a graphical user interface. For example, the user may manipulate a visual dial to indicate the balance of information among the persona(s) that is desired.

Figure 3:
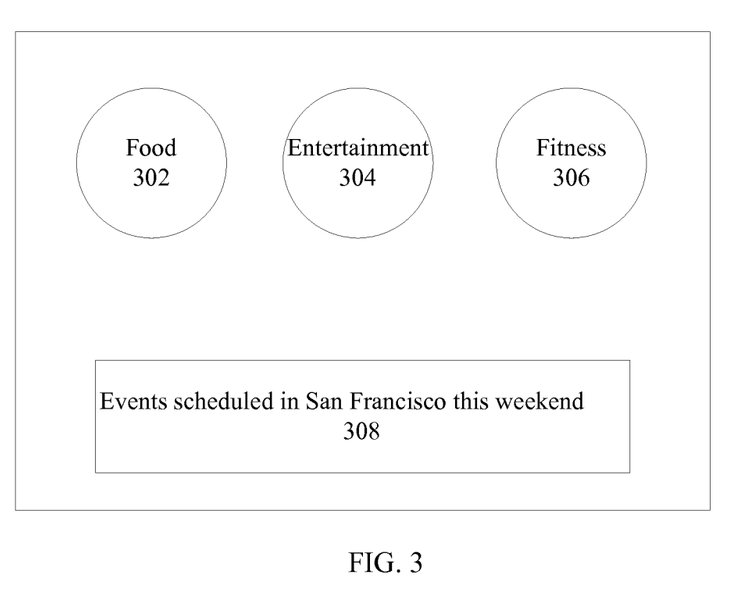
FIG. 3 is a diagram illustrating an example graphical user interface that may be implemented in accordance with various embodiments.

FIG. 3 is a diagram illustrating an example graphical user interface that may be implemented in accordance with various embodiments. Each one of a plurality of personalization engines may be represented by a corresponding icon. As shown in this example, icons labeled "Food" 302, "Entertainment" 304, and "Fitness" 306 may be presented.

A user may select one or more of the personalization engines from which the user would like to receive information by clicking on one or more of the icons 302, 304, 306. In addition, an input box 308 may be provided via the graphical user interface. The user may therefore submit a query that indicates the information the user wishes to receive. In this example, the query is "Events scheduled in San Francisco this weekend."

In response to the user's query, each of the selected personalization engines may provide information to the user. For example, the "Food" personalization engine may notify the user of a wine tasting, as well as notify the user of several new restaurants that have opened in San Francisco. The "Entertainment" personalization engine may notify the user of charity events and plays scheduled in San Francisco for the weekend. The "Fitness" personalization engine may remind the user to go to Yoga class on Saturday and to go running on Sunday with the user's running club.

In accordance with various embodiments, the information that is provided may include one or more advertisements. Each of the advertisements may be associated with a corresponding bid indicating a number of impressions that are to be satisfied by individuals possessing a particular set of characteristics. Furthermore, a bid may indicate one or more characteristics of the personalization engine (or persona) that are to provide the advertisement. For example, advertisers may bid on a keyword "Food" in order for an advertisement to be presented by the "Food" personalization engine. As another example, advertisers may bid on one or more personalization engines to have their advertisement presented by a particular personalization engine (e.g., "Food") that is active (e.g., operating to provide information to a user). Where the information that is presented includes an advertisement, the advertiser may be charged according to a variety of billing schemes. In one embodiment, the advertiser may be charged based, at least in part, upon characteristics that have been specified by the advertiser in the bid submitted in association with the advertisement. More particularly, the advertiser may be charged based, at least in part, upon one or more characteristics of the individuals and/or the personalization engine (or persona) identified in the bid. For example, an advertiser for a gym may be charged more for advertising to individuals who are specifically interested in receiving information pertaining to "Fitness" (e.g., by selecting or activating a Fitness personalization engine) than for advertising to individuals who are not interested in receiving information pertaining to "Fitness" (e.g., those who have not elected to select or activate a Fitness personalization engine).

Data Signals

Various data signals may be used to identify information to be provided or accessed by a particular personalization engine. More particularly, a personalization engine may access various data signals so that the personalization engine may personalize information that is provided. Each of the signals may be obtained from one or more data sources. Example signals will be described below. However, it is important to note that these examples are merely illustrative, and other types of signals may also be detected.

A user's profile may be accessed to personalize information for a particular user. More particularly, a profile may include information such as prior purchase history, marital status, general interests, and/or demographic information (e.g., age, sex, and/or zip code).

The data that is obtained and/or analyzed may further include one or more calendar entries of a user's electronic calendar. A calendar entry may include structured geographic information identifying an event being attended by the user. For example, the structured geographic information may include a restaurant name and/or address, airport code(s), hotel reservation(s) (e.g., hotel name and/or address), destination address(es), driving directions, and/or event(s) such as baseball games, concerts, fitness classes, etc. (e.g., identified event name and/or address). Each calendar entry may further indicate a time (e.g., date, start time, length, and/or time period) of the event.

Calendar entries of an electronic calendar of a user may be accessed to identify plans of the user, as well as possible future locations of the user. For example, where the user has scheduled a Yoga class at 5:30 PM every Wednesday evening, the "Fitness" personalization engine may remind the user to attend the Yoga class. A personalization engine may send a reminder to a user via a variety of mechanisms such as a pop-up window, visual indicator, sound byte, email, and/or text message.

The current location of a website user may be determined based upon location data that the user has explicitly and/or implicitly provided to the website. More particularly, the location data may be obtained from account data provided by the user during registration or as a result of updating the account data after registration has been completed. For example, the account data may include a registration zip code, home location (e.g., address or portion thereof), and/or work location (e.g., address or portion thereof). Therefore, the account data for a particular website user may identify one or more locations of the website user.

In addition, the current location of a user may also be identified based upon signals explicitly transmitted by the user or implicit signals. Examples of implicit signals include an IP address of the website user or Global Positioning System (GPS) location, which may be used to infer a current location, a home location, or a work location. As another example, the user's location may be implied through cell tower triangulation. In addition, a user may explicitly check in to a location via the use of a check in application, which may be accessed via a website and/or installed on a device such as a mobile device. The location of the user may be reported to a central system (e.g. associated with a website).

In accordance with various embodiments, the location of a user may be periodically ascertained (e.g., via a GPS implemented on a mobile device). Based upon the location of the user, a personalization engine may ascertain whether the user attends scheduled events such as fitness classes. In this manner, the personalization engine may follow a user's progress with respect to a particular persona. For example, if a user misses his or her Yoga class, the "Fitness" personalization engine may notify the user that they have missed their Yoga class and that they need to be better about attending the class in order to stay in shape.

In addition, the data that is obtained and/or analyzed may identify one or more events that the user is interested in and/or planning on attending. More particularly, an event may be identified based upon whether the user has clicked "Buy Ticket(s)" for the event or whether the user has explicitly selected "I'm interested" for the event. Example events for which the user may purchase tickets may include sporting events, movies and/or theater productions.

In accordance with various embodiments, the user may define an event via an application implemented on a web site and/or installed on a mobile device such as a smartphone. More particularly, the user may define an event based upon one or more geographical criteria and/or time-based criteria. Such a user defined event may be referred to as a "bubble." An event that is occurring at a future time may be referred to as a "future bubble." The creation of a bubble may be interpreted by the system as interest of the user in the event defined by the bubble. In addition, if a user has explicitly indicated that they are interested in the bubble by selecting "I'm interested," this may also be interpreted by the system as interest of the user in the event.

Furthermore, travel booking data may be obtained and/or analyzed to identify an event that the user is interested in and/or planning on attending. More particularly, travel search data may be obtained from the user's search and browsing history. The travel search data may further identify one or more flights that the user has booked (e.g., purchased or reserved), one or more hotel reservations that the user has booked, and/or one or more rental car reservations that the user has booked. A flight that a user has booked may be identified by a date, time, flight number, and/or airport code. Similarly, a hotel reservation may be identified by a hotel name, address, location, check-in date, and/or check out date. A rental car reservation may be identified by a name of a rental car agency, a start time and/or return time.

Advertiser/Content Distributor Interface

The system may provide a bidding platform enabling advertisers to submit bids in association with advertisements. More particularly, an advertiser may submit a bid specifying a number of impressions for a particular advertisement and characteristics of a user population to satisfy the number of impressions. Moreover, within a bid associated with a particular advertisement, an advertiser may specify a set of one or more keywords and/or one or more features of a persona (or personalization engine). Example features of a persona (or personalization engine) may include a title and/or a type of persona. Example titles or types of personas may include "Mood," "Fitness," "Food," and/or "Entertainment." Once bids are obtained from advertisers in association with a plurality of advertisements, the system may allocate the advertisements among a plurality of users.

In accordance with various embodiments, the system may support the generation and/or provision of advertisements by advertisers that correspond to the available Personas. In addition, the system may support the selection and presentation of advertisements that are in line with the personas that are active. For example, if a "Skeptical" persona is active, the advertisement that is selected may present a large factual basis for purchasing the product or service being advertised. Alternatively, for a "Creative" persona, the creativity of the advertisement is more important than the factual content of the advertisement.

The price that an advertiser is charged for providing an advertisement to a user (or group of users) may be based upon various factors. In accordance with one embodiment, the price that the advertiser is charged may depend, at least in part, upon the value of the characteristic(s) of the individuals receiving the impressions, the value of the persona (or personalization engine), and/or the pertinence of the persona (or personalization engine) to the advertisement.

The system may provide a graphical user interface informing advertisers of standard advertising charges associated with specific characteristics of individuals and/or personas. For example, the bidding platform may enable advertisers to select one of a plurality of personas in association with a particular bid. The system may further provide a graphical user interface enabling advertisers to monitor the charges accrued in association with each advertisement.

The system may determine the effectiveness of an advertisement based upon whether the user purchased the product or service advertised to the user. For example, the system may ascertain whether the user visited a location or business that was advertised in the advertisement. This may be accomplished by ascertaining whether the user checked in to the location or business via a mobile device, or through other mechanisms. From this information, it is possible to determine whether the advertisement was effective in influencing future user behavior. This determination may be used to further tune the ability of the system to select an appropriate advertisement to provide to a user under various circumstances. Information pertaining to effectiveness of the advertisement may be provided to the advertiser via a graphical user interface.

Figure 4:
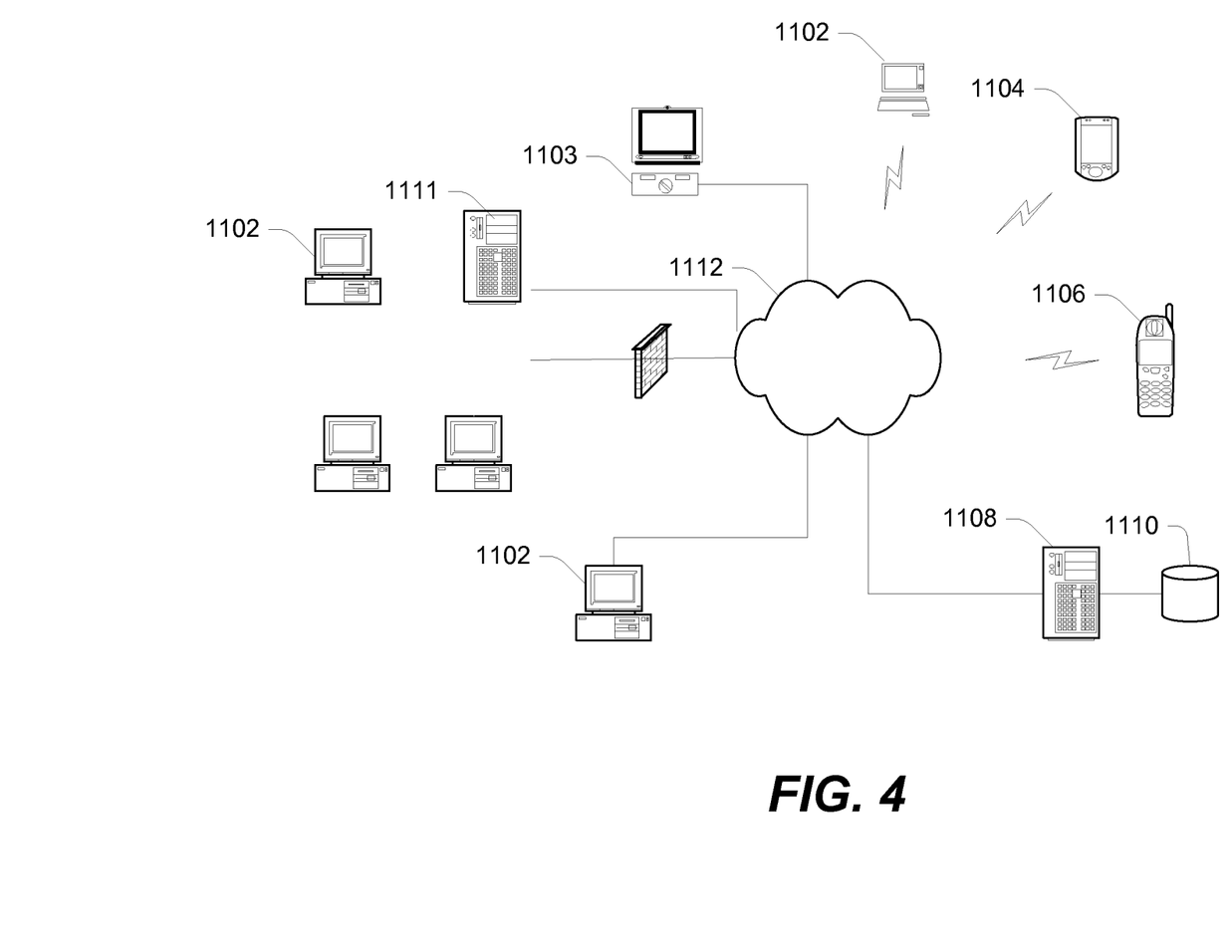
FIG. 4 is a simplified diagram of an example network environment in which various embodiments may be implemented.

The disclosed embodiments may be implemented in any of a wide variety of computing contexts. For example, as illustrated in FIG. 4, implementations are contemplated in which users interact with a diverse network environment via any type of computer (e.g., desktop, laptop, tablet, etc.) 1102, media computing platforms 1103 (e.g., cable and satellite set top boxes and digital video recorders), handheld computing devices (e.g., PDAs) 1104, cell phones 1106, or any other type of computing or communication platform.

And according to various embodiments, input that is processed in accordance with the invention may be obtained using a wide variety of techniques. For example, input for may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input for performing social authority based advertising may be obtained in many other ways.

Personalization of content via personalization engines may be performed according to the disclosed embodiments in some centralized manner. This is represented in FIG. 4 by server 1108 and data store 1110 which, as will be understood, may correspond to multiple distributed devices and data stores. The data store 1110 may store user profile data and data obtained from various data stores, and/or advertising bids. The invention may also be practiced in a wide variety of network environments (represented by network 1112) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. Moreover, a system implementing various embodiments of the invention may be a portable device, such as a laptop or cell phone. The apparatus and/or web browser of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, displaying graphical user interfaces to be displayed in association with the disclosed methods, determining personalized content by personalization engines, and/or facilitating advertiser bidding, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 5:
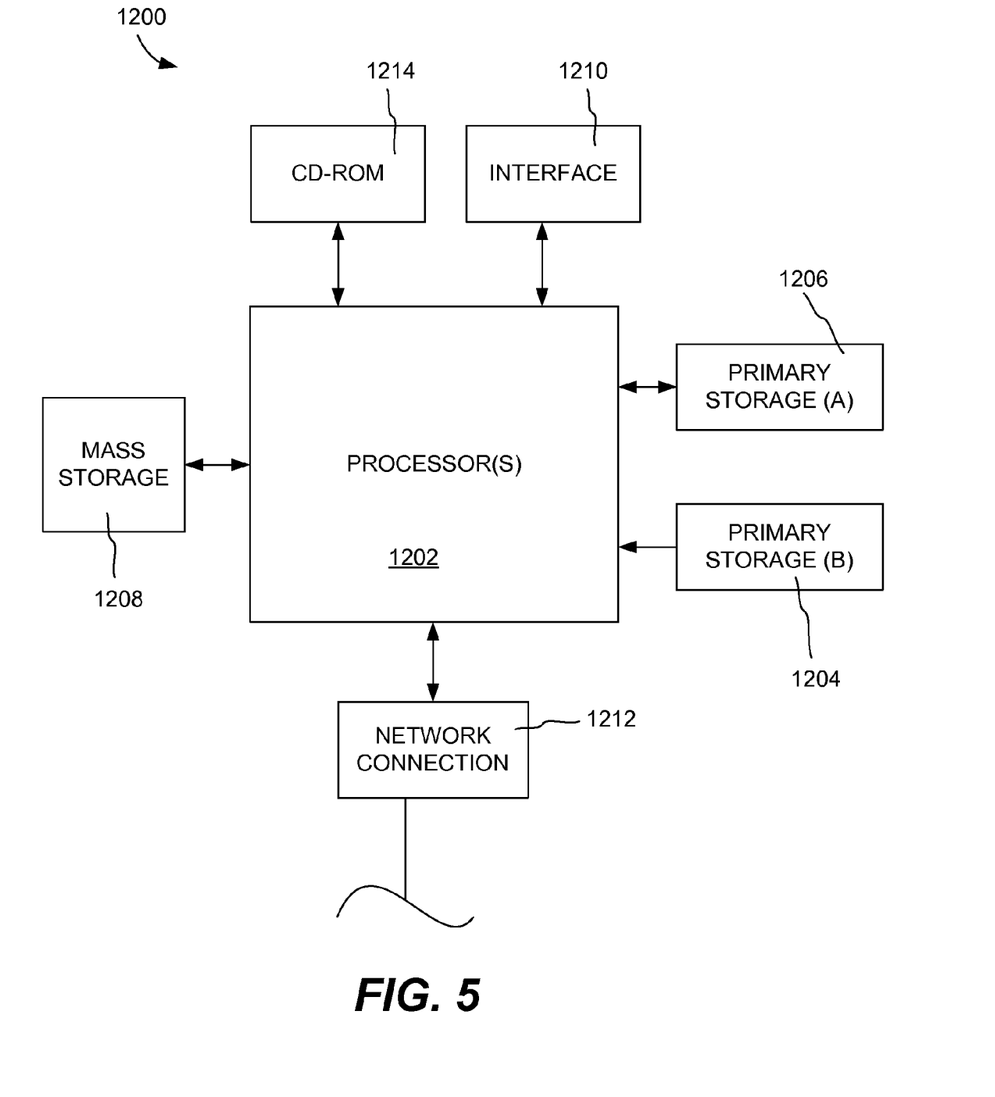
FIG. 5 illustrates an example computer system in which various embodiments may be implemented.

FIG. 5 illustrates a typical computer system that, when appropriately configured or designed, can serve as a system of this invention. The computer system 1200 includes any number of processors 1202 (also referred to as central processing units, or CPUs) that are coupled to storage devices including primary storage 1206 (typically a random access memory, or RAM), primary storage 1204 (typically a read only memory, or ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
presenting, via a graphical user interface of a mobile device, indications of a plurality of personas, wherein each of the plurality of personas is user-selectable to provide content via the mobile device;
obtaining input via the mobile device, wherein the input indicates a selected one or more of the plurality of personas;
identifying one or more personalization engines from a plurality of personalization engines based upon the selected one or more of the plurality of personas, wherein the one or more personalization engines operate according to the selected one or more of the plurality of personas;
receiving a query via the mobile device;
obtaining, by the one or more personalization engines operating according to the selected one or more of the plurality of personas, content that is published on the Internet based, at least in part, on the query and providing the content in response to the query received via the mobile device; and
wherein each one of the plurality of personalization engines is configured to obtain and provide content published on the Internet according to a different one of a plurality of personas.

2. The method as recited in claim 1, wherein the one or more of the plurality of personalization engines comprises two or more of the plurality of personalization engines, wherein providing content comprises:
providing the content by the two or more of the plurality of personalization engines.

3. The method as recited in claim 2, further comprising:
receiving, at the mobile device, input to select two or more personas from the plurality of personas, wherein the two or more personas correspond to the two or more of the plurality of personalization engines.

4. The method as recited in claim 3, further comprising:
receiving input indicating an allocation of the two or more personas; and
generating the content by one or more of the two or more personalization engines according to the allocation.

5. The method as recited in claim 2, wherein providing the content by the two or more personalization engines comprises:
providing a first set of content via the mobile device from a first one of the two or more personalization engines during a first time period; and
providing a second set of content via the mobile device from a second one of the two or more personalization engines during a second time period.

6. The method as recited in claim 2, wherein providing the content by the two or more personalization engines comprises:
providing a first set of content from a first one of the two or more personalization engines and a second set of content from a second one of the two or more personalization engines for presentation via a single graphical user interface of the mobile device.

7. The method as recited in claim 2, wherein providing content by the two or more personalization engines comprises:
obtaining a first set of content from a first one of the two or more personalization engines;
obtaining a second set of content from a second one of the two or more personalization engines;
generating a third set of content from the first set of information and the second set of information; and
presenting the third set of content via a graphical user interface of the mobile device.

8. The method as recited in claim 1, wherein each of the plurality of personalization engines is optimized to achieve a different one of a plurality of goals, or operate according to a different one of a plurality of moods, points of view, or interests.

9. The method as recited in claim 1, wherein the one or more personas comprise two or more personas;
wherein the input further indicates an allocation of the two or more personas;
wherein obtaining the input comprises:
obtaining the allocation via a graphical element displayed in a graphical user interface;
wherein the content is further provided according to the allocation.

10. The method as recited in claim 1, further comprising:
providing for presentation via a graphical user interface of the mobile device a visual indicator that indicates the one or more of the plurality of personas that are active.

11. The method as recited in claim 1, wherein presenting, obtaining, identifying, receiving, and providing are performed by a mobile application installed on the mobile device.

12. The method as recited in claim 1, wherein each one of the plurality of personalization engines is configured to obtain content from a corresponding search engine.

13. The method as recited in claim 1, wherein the plurality of personas comprise a plurality of personality characteristics.

14. A mobile device, comprising:
a processor; and
a memory storing thereon computer-readable instructions that, when executed by the processor, are configured for:
receiving input, wherein the input includes a query and a selection of one or more of two or more personas;
identifying one or more of two or more personalization engines that operate according to the one or more of the two or more personas; and
obtaining, by the one or more of two or more personalization engines, content that is published on the Internet based, at least in part, on the query and providing the content via a graphical user interface of the mobile device in response to the query received via the mobile device; and
providing, via the graphical user interface of the mobile device, a visual indicator of the one or more of the plurality of personas that are active.

15. The mobile device as recited in claim 14, wherein the input indicates an allocation of one or more of the two or more personalization engines from which a user wishes to receive the content.

16. The mobile device as recited in claim 14, wherein the input comprises a question, and where the content comprises at least one answer to the question.

17. The mobile device as recited in claim 14, wherein the input associates each one of two or more devices with a corresponding one of the two or more personalization engines.

18. The mobile device as recited in claim 14, wherein providing the content by the one or more of two or more personalization engines comprises:
   providing content by the one or more personalization engines based, at least in part, upon a user profile of-the user.

19. The mobile device as recited in claim 14, wherein the content comprises one or more advertisements.

20. The mobile device as recited in claim 14, wherein a first one of the two or more personalization engines is optimized to achieve a first goal, or operate according to a first mood, point of view, or interest, and wherein a second one of the two or more personalization engines is optimized to achieve a second goal, or operate according to a second mood, point of view, or interest.

21. The mobile device as recited in claim 14, wherein the memory has stored thereon computer-readable instructions for implementing each of the one or more of the two or more personalization engines.

22. A non-transitory computer-readable medium storing thereon computer-readable instructions, comprising:
   instructions for obtaining input via a mobile device, the input indicating a selection of one or more of two or more personas from which to receive content at the mobile device;
   instructions for identifying a personalization engine based upon the one or more of the two or more personas;
   instructions for receiving a query via the mobile device; and
   instructions for obtaining, by the personalization engine, content that is published on the Internet based, at least in part, upon the query that has been received and providing the content via a graphical user interface of the mobile device in response to the query received via the mobile device.

23. The non-transitory computer-readable medium as recited in claim 22, wherein the input further associates the personalization engine with a device such that the content is provided via the device.

24. The non-transitory computer-readable medium as recited in claim 22, obtaining the input from the user comprises:
   providing, for presentation via a graphical user interface, indications of a plurality of personas that are selectable to provide content;
   receiving a selection of the two or more personas from the plurality of personas.

25. The non-transitory computer-readable medium as recited in claim 22, wherein the query comprises a question, and where the content comprises at least one answer to the question.

26. The non-transitory computer-readable medium as recited in claim 22, wherein providing the content by the personalization engine comprises:
   identifying a user profile of a user from which the input was received; and
   wherein the content is further provided by the personalization engine based, at least in part, upon the user profile.

27. The non-transitory computer-readable medium as recited in claim 24, wherein the indications comprise icons.

* * * * *